Figure 12:
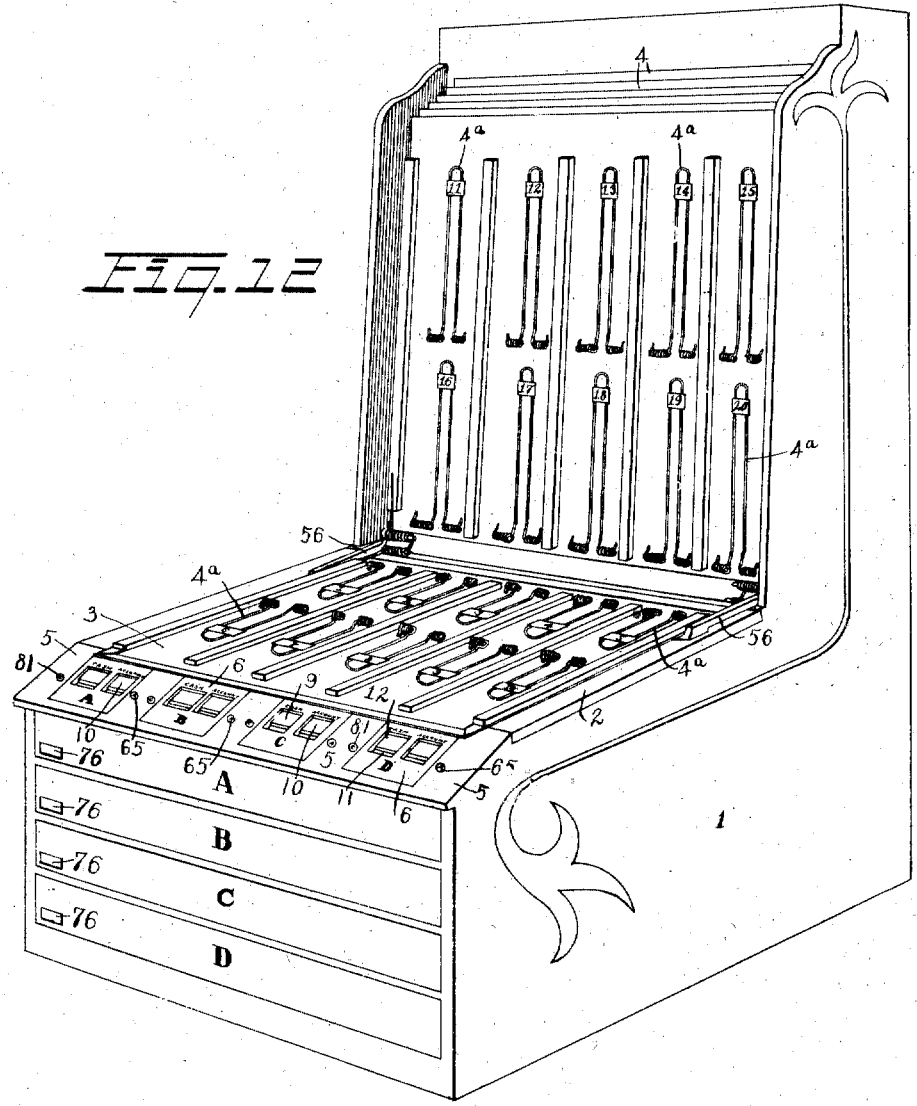

P. A. McCASKEY.
COMBINED ACCOUNT AND CASH REGISTER.
APPLICATION FILED JUNE 3, 1908.
1,001,875.
Patented Aug. 29, 1911.
4 SHEETS—SHEET 1.
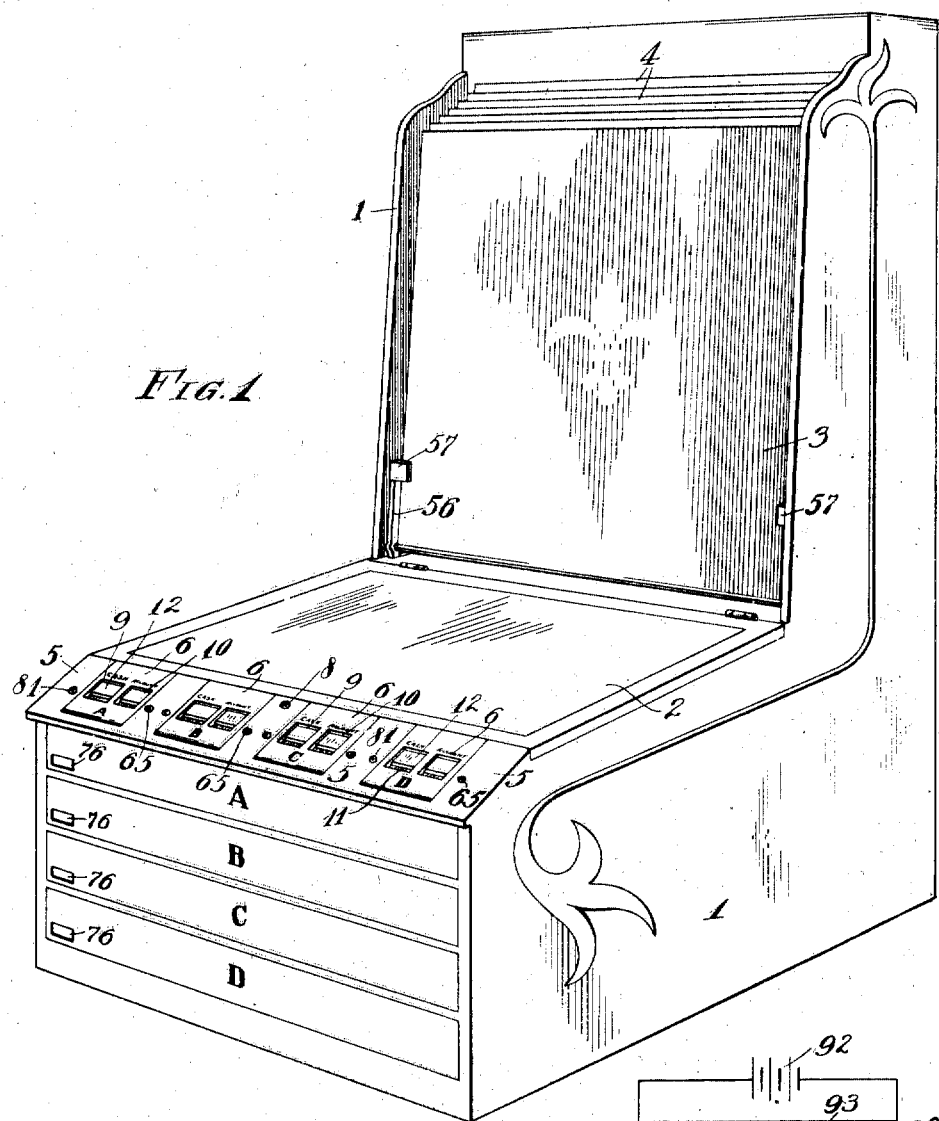
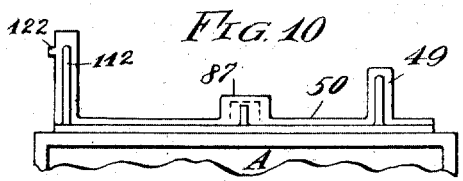
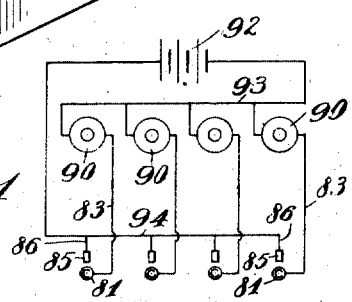
WITNESSES:
Brennan B. West.
W. L. McGarrell.
INVENTOR,
Perry A. McCaskey.
BY Bates, Fouts & Hull
ATTYS.

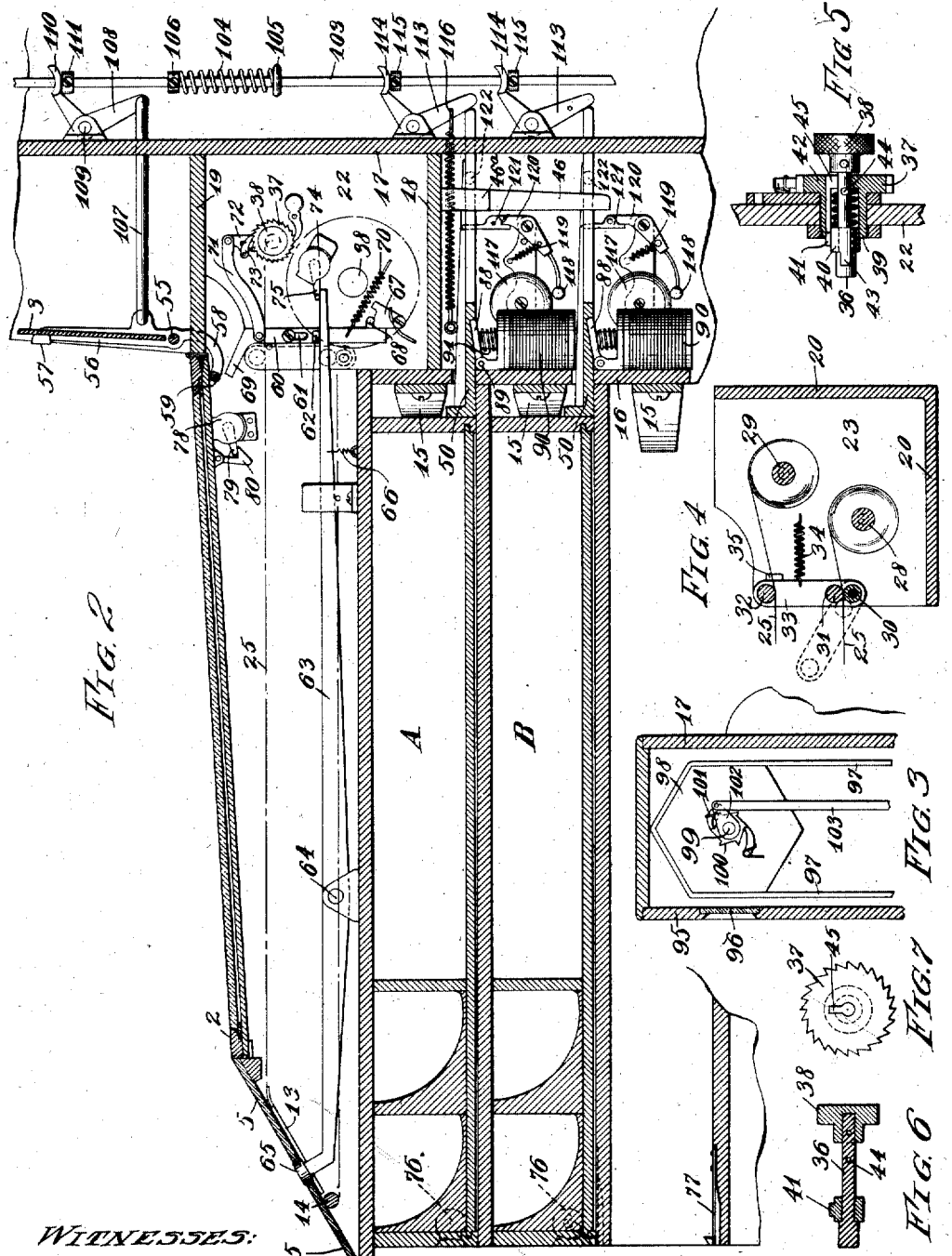

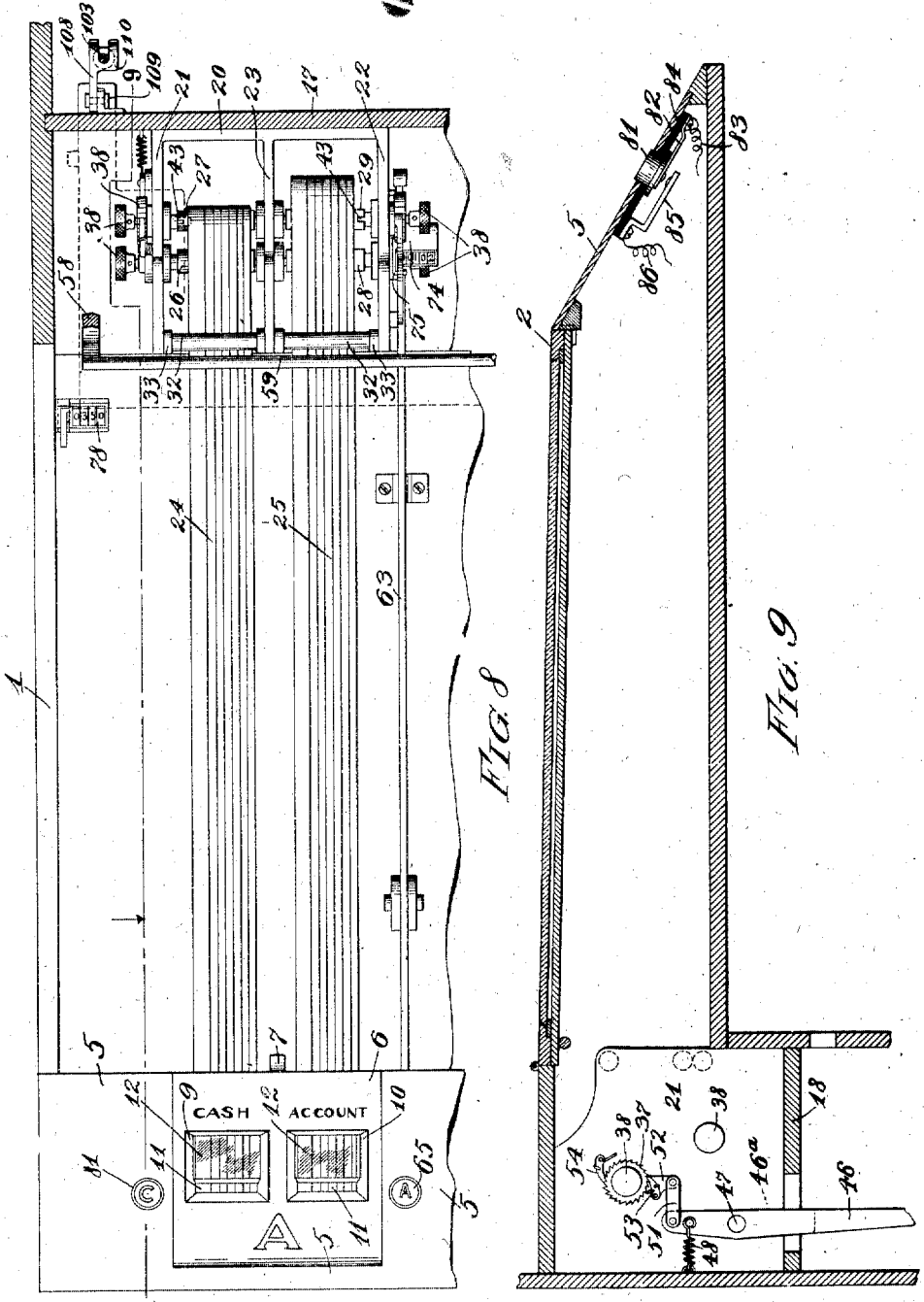

UNITED STATES PATENT OFFICE.

PERRY A. McCASKEY, OF ALLIANCE, OHIO.

COMBINED ACCOUNT AND CASH REGISTER.

1,001,875.

Specification of Letters Patent.   Patented Aug. 29, 1911.

Application filed June 3, 1908.  Serial No. 436,338.

*To all whom it may concern:*

Be it known that I, PERRY A. MCCASKEY, a citizen of the United States, residing at Alliance, in the county of Stark and State of Ohio, have invented a certain new and useful Improvement in Combined Account and Cash Registers, of which the following is a full, clear, and exact description, reference being had to the accompanying drawings.

This invention relates to credit accounting appliances, the same being an improvement upon the machine known on the market as the McCaskey account register, such as is shown in my Patent No. 783,126, the object of the invention being to provide said machines with an individual autographic account record strip for each clerk, whereby the recorded transactions may be compared with the sales slips of said clerks which are filed in the machine.

A further object of the invention is to combine with the account record strips a corresponding number of autographic cash record strips, and to further combine with the cash record strips a corresponding number of cash receptacles in which the moneys of the respective clerks may be kept segregated from the moneys of the other clerks. Provisions are also made for feeding the account record strips from the main front leaf of the account register and for feeding the cash record strips from the respective cash receptacles, selecting mechanism being also provided for causing either of the account or the cash record strips to be separately fed. By these means the proprietor is enabled to compare the record strips of the several clerks with one another so as to ascertain the relative numbers of sales made—this being an index to the efficiency of the clerks—and to compare the records on said strips with the sales slips filed in the machine.

Combined also with the main front cover of the account recorder and with the cash drawers is an advertising device which is operated whenever a cash receptacle or the main front cover is operated.

In the accompanying drawings, Figure 1 is a perspective view showing an account recorder of the type shown in my said patent, the recorder having my invention applied thereto; Fig. 2 shows a vertical section taken through the machine in the plane of one of the clerk's cash keys, said view showing the mechanism for operating the advertising belt; Fig. 3 is a section through the upper part of the casing for the advertising belt, showing the roller over which said belt passes and the means for turning the roller; Fig. 4 is a detail view of the frame in which the spools for the record strips are journaled; Fig. 5 is a detail sectional view through the mechanism for turning one of said spools; Fig. 6 is a longitudinal section through the plunger shown in Fig. 5; Fig. 7 is a side elevation of the ratchet wheel shown in Fig. 5; Fig. 8 is a plan view, partly in section and partly in elevation, showing the arrangement of the cash and the account record strips and the manner in which the spools for said strips are mounted in the casing; Fig. 9 is a sectional view taken substantially on the line 9—9 of Fig. 8 and looking in the direction of the arrow thereon; Fig. 10 is a plan view of the rear end of a cash receptacle showing the plate thereon for operating the advertising belt, for locking the cash receptacle and for feeding the cash record strips; Fig. 11 is a diagrammatic view showing the electrical connections for controlling the release of the cash receptacles; and Fig. 12 is a view like Fig. 1, except that the front leaf is in its forward position, and the spring clips on said leaf and on the adjacent leaf are shown.

Taking up a fuller description of my invention by reference to the drawings, in which the same reference characters designate the same parts throughout the several views, 1 represents the sides of the main casing, 2 the hinged cover for the index sheet, 3 the main front leaf of the account recorder, and 4 the series of pivoted vertically extending leaves upon which are mounted the spring clips 4ᵃ for holding the sales slips, the parts thus referred to being illustrated in my said Patent No. 783,126, so that it is not necessary to describe the same further in this application. In front of the hinged cover 2 and, by preference, sloping downwardly from the front edge of said cover, is a plate 5 which is partially divided at intervals throughout its length so as to receive pivoted cover plates 6, there being one of said pivoted plates for each of the clerks operating the machine. Each of these plates is provided at its rear edge with a rearwardly projecting tongue 7, over which the front edge of the hinged cover 2 is adapted to extend when the cover is closed. Preferably the cover 2 is locked in its closed position, the lock therefor being indicated at 8 in Fig. 1, said figure showing the cover-plate closed. When, therefore, the cover 2 is locked, the cover plates 6 are likewise locked.

Each of the cover plates 6 is provided with an opening 9, and a correspondingly shaped opening 10, the openings in the several cover plates forming a transverse row across the machine. Within these openings, and closing the same except for narrow slots 11, are transparent plates 12 of glass or similar material, the slots 11 being of a width sufficient to enable the clerks to write therethrough on the record strips below the same. The cover plate 6 at the left side of the machine is designated A, the next cover plate is designated B, the third, C, and the fourth, D, the record strips corresponding with said plates being used by the clerks A, B, C and D respectively. Below the cover plates 6 I secure writing tables 13 over which the record strips are fed, said strips being guided at the lower edge of said tables by a roller 14. As shown in Fig. 12, the slots 11 are not covered by the front leaf 3 when the same is in its forward position, thus enabling the clerk to make his record after the said leaf is opened if he so desires, although in the normal operation the said record would be made before the leaf is operated so as to feed the record strip immediately and thus bring the record beneath the plate 12, in which position it cannot be altered.

Within the main cabinet beneath the record strips I mount a series of cash receptacles, corresponding in number with the number of clerks using the machine, each receptacle being under control of its respective clerk and within which said clerk keeps the money with which he is intrusted. These cash receptacles are preferably in the form of sliding cash drawers, as shown, the drawers being provided in front with letters designating the clerk using the same, such as the letters A, B, C and D, said letters being hereinafter used for reference to these drawers. The drawers are normally held in their closed position by means hereinafter described, but are thrown outwardly when released by springs 15, which are preferably of the semi-elliptic type, and which are secured to a vertically extending plate 16 at the rear of the cash drawers. Spaced from the plate 16, and extending parallel therewith at the rear of the leaves 4, is a plate 17, said plates 16 and 17 being connected at the rear of cash drawer A by a horizontal plate 18, and by a top plate 19 which extends forwardly from the plate 17, thus forming a compartment in which I mount frames 20 for the reels carrying the record strips. As shown in Fig. 8, one of these frames is used for the cash and account record strips of a clerk, so that as many of these frames would be employed as there are clerks using the machine. Each frame is composed of a transverse rear and bottom portion (see Fig. 4), from which project forwardly end housings 21 and 22 and a central housing 23. Each of the record strips is carried upon a pair of spools, the record strips for the cash transactions being indicated at 25, Fig. 2 showing one of the account record strips. The supply reel 26 and the take-up reel 27 of the strip 24 are mounted in journal bearings between the housings 21 and 23, while the supply reel 28 and the take-up reel 29 for the strip 25 are journaled between the housings 22 and 23, the said take-up spools for clerk A being in axial alinement so as to use the same inner bearing in the housing 23, while the supply spools are correspondingly arranged. The record strips are led from the supply reels forwardly between guide rollers 30 and 31, and thence around the roll 14 at the front of the machine, over the tables 13 and back below guide rolls 32 to the take-up reels. For a purpose hereinafter set forth, I prefer to mount the guide rollers 31 and 32 in a pivoted frame 33, said frame extending between the side housings 21 and 22 and being pivoted at its lower end. A spring 34 holds the said frame 33 normally in vertical position against a stop 35 on one of the housings.

The take-up reels are journaled at their outer ends on a plunger 36 which extends axially through a ratchet wheel 37 for turning the take-up reels. On the outer end of the plunger 36 I secure a milled head 38 by means of which the plunger may be turned within the ratchet wheel, or may be pulled outwardly against the tension of a spring 39 which surrounds the plunger within the hub of the wheel. Mounted on the plunger 36 so that the latter may turn therein, is a clutch member 40, said member having a lug 41 projecting therefrom and adapted to slide in a key way 42 in the hub of the ratchet wheel 37. Also projecting from the inner face of the clutch member 40 is a projection 43 which is adapted to extend into a recess in the adjacent end of the take-up reel, whereby the latter is turned with the clutch member. The engagement of the lug 41 with the key way 42 causes said clutch member to be turned with the ratchet wheel, so that motion is transmitted from said wheel to the reel. 44 is a pin that projects from the plunger 36 and is adapted to be drawn through a slot 45 in the ratchet wheel, after which the plunger may be turned to carry the pin away from the slot and thus hold the plunger outwardly against the tension of the spring. When the pin 44 engages with the outer face of the ratchet wheel, the projection 43 is withdrawn from the recess in the end of the reel so that the latter may be turned freely on the end of the plunger, such an operation being desirable when the proprietor wishes to inspect accounts on the record strip that do not appear when the cover plate 2 is opened. When the plunger 36 is drawn outwardly to a further extent, the take-up reels may be removed bodily from their frames. As appears from Fig. 8, the supply reels are likewise provided with plungers similar to the plunger 36, except that the plungers for these reels are not provided with clutch members, it being understood that the supply reels are not driven except as the same are rotated by drawing the strips therefrom. For the purpose of enabling the supply and take-up reels to be removed and replaced readily, the frames 33 are pivoted between the end housings 21 and 22 so that they may be turned forwardly as shown in dotted lines in Fig. 4 and be thus removed to a position where they will not interfere with the said reels.

The strips 24 are fed when their respective cash receptacles are closed through the medium of levers 46, 46ª, etc., which are pivoted at 47 and project downwardly through the plate 18 into the casing at the rear of the cash drawers, there being one of said levers terminating adjacent each of said drawers and being operated thereby. The lower ends of said levers are impelled toward the cash drawers by springs 48, and the levers are pushed rearwardly by a projection 49 on a plate 50 that is secured to the cash drawer, it being understood that each cash drawer is provided with one of said plates. The various cash record strips being located in different positions in the casing, and the respective levers 46, 46ª, etc., occupying positions corresponding with that of the said record strips, it follows that the projections 49 on the different cash receptacles will be so positioned as to engage with the different levers. To the upper end of each of said levers I attach a link 51, which is connected to the free end of a pawl carrying arm 52, each of said arms being journaled upon the axis of the ratchet wheel 37 for the corresponding cash record strips. The arms 52 are each provided with an actuating pawl 53, which engage with the teeth on the ratchet wheel, whereby the said wheel and its corresponding take-up reel are turned a distance corresponding to one tooth on the ratchet wheel whenever the respective cash receptacle is opened and is again closed. For preventing a reverse rotation of the ratchet wheel, I provide a detent pawl 54 which is spring-pressed into engagement with the teeth of the ratchet wheel.

The account record strips are fed when the front cover plate 3 is moved forwardly about its pivot rod 55, which movement is necessary in order that the sales slips may be filed on the pivoted leaves, as will be understood from my said patent. Journaled on the same pivot rod 55, and extending upwardly at each edge of the front leaf 3, are arms 56, having inwardly projecting lugs 57 which extend in front of the edges of the front leaf whereby, when the latter is moved forwardly, the arms 56 will likewise be moved forwardly. I prefer to have no positive connection between the front leaf and the arms, for the reason that the series of leaves are intended to be removed bodily from the machine and placed in a vault for safety when the machine is not in use. Extending downwardly from each of the arms 56 through slots in the plate 19 is an arm 58, said arms being connected at their free ends by a rod 59, it being understood that the arms 58 are on opposite sides of the machine and that the rod 59 extends practically across said machine. In order that the rod 59 may not interfere with the movement of the front leaf 3, the arms 58 are curved forwardly as shown, so that the said leaf may be turned downwardly its full extent before the rod engages with the plate 19. Mounted to slide upon each of the housings 22 in which the spools for the account record sheets are journaled, is a plate 60 having a slot 61 therein through which projects a shoulder screw or pin by means of which the plate is pivoted and is held to the housing so as to be capable of slight vertical movement. Projecting from the side of the plate 60 is a lug 62, beneath which extends the rear end of the corresponding clerk's account key-lever 63. There is one of these key-levers for each of the clerks, and each lever is pivoted at a point 64 and has its forward end extending upwardly and terminating in a push button or key 65, which extends through an opening therefor in the plate 5, the key lever being held with the push button elevated by means of a spring 66 which connects the key lever with the stationary part of the machine. When one of the clerk's account keys is depressed, it lifts its plate 60 until the lower end thereof is caught by a spring-pressed dog 67 that is mounted on the housing 22, which dog moves forwardly under the plate until it is stopped by its engagement with a stationary pin 68. At its upper end, each of the plates 60 is provided with a forwardly extending finger 69 with which the rod 59 is adapted to engage when the front leaf 3 is opened. When, therefore, the clerk's account key is depressed, the finger 69 is lifted into the path of the rod 59 and is held in such position by the dog 67, whereby the opening movement of the front leaf causes the plate 60 to be swung about its pivot pin, the rear end of said plate moving forwardly until it escapes the front edge of the dog 67 when the plate is drawn downwardly by a spring 70. This spring is so attached to the plate 60 and to the housing 22 that it not only holds the plate downwardly, but draws the rear end of the plate rearwardly, and thus restores the latter to its normal position.

To the upper end of each of the plates 60, I attach a link 71, the rear end of which is connected to an arm 72 that is journaled on the axis of the take-up roller for the account record strip, said arm having a pawl 73 that is spring-pressed into engagement with the teeth of the corresponding ratchet wheel 38.

From this description it will be understood that unless a clerk's account key is depressed, the movement of the front leaf has no effect upon the account record strips; but when one of said account keys is depressed and the front leaf is then opened, the account record strip corresponding to the depressed key is moved rearwardly a distance corresponding to one tooth on its ratchet wheel.

In order that the proprietor may readily ascertain the number of entries made on each of the account record sheets, I provide an individual register 74 for each of the account keys, said registers each having an operating arm 75 that projects over the rear end of the corresponding key-lever 63 whereby, as the key is rocked the operating arm is also rocked and the register turned forward one number. These registers may be located in any convenient position, but I prefer to mount the same upon the housings 22, as shown. Special registers 76 are also employed for showing the number of times each cash receptacle is operated, which number will correspond to the number of entries made on the respective cash record strips. Each of the registers 76 is provided with a depending operating arm that is adapted to engage with a spring hook 77 below its cash receptacle whereby, upon the opening of the receptacle, the hook will cause the operating arm to be turned so as to add one on the register. The proprietor may also desire to know the number of times the hinged cover 2 had been opened; for that purpose I secure to the casing a special register 78 having an operating arm 79 that is adapted to be rocked by a pivoted hook 80 that is secured to the hinged cover, whereby, when the cover is opened the operating arm will be rocked to add one on the register 78.

As will be noted from Figs. 1 and 8, the account keys 65 are located to the right of the pivoted cover plates 6 of the respective clerks. To the left of these cover plates I place the cash keys 81, one of said keys being shown in detail in Fig. 9 of the drawing and consisting of a push button that is mounted upon the free end of a spring contact plate 82, to which plate a conductor 83 is attached, the spring 82 being mounted upon insulating plates 84. Also mounted on each of said plates is a contact 85, having a conductor 86 attached thereto. Upon the depression of the push button 81, connection is made between the contacts 82 and 85. These contacts and conductors are in a system of wiring by means of which the release of the several cash receptacles is controlled, as will hereinafter appear.

By reference to Figs. 2 and 10, it will be seen that the plates 50 on the rear ends of the cash receptacles are each provided with a projection 87, said projections each having a recess in its lower face into which projects a latch 88, said latches being pivoted at 89 to the rear face of the plate 16, whereby the cash receptacles are latched in their inner position. To each of the latches 88 I secure a solenoid plunger, the latter projecting downwardly into a solenoid 90 that is likewise carried by the plate 16, the latches being held upwardly into engagement with the projection 87, by springs 91 which surround the solenoid 4 between the latches and the solenoids. From this description the system of wiring shown in Fig. 11 will be understood, in which figure the cash record buttons are indicated at 81 and the solenoids at 90. 92 represents a source of electrical energy, such as a battery, from which extend the lead wires 93 and 94, the solenoids being connected in parallel across said lead wires through the conductors 83 and 86, hereinbefore described. When a button 81 is depressed, its corresponding solenoid will be energized to the exclusion of all the other solenoids, which results in the release of the corresponding cash receptacle.

At the rear of the vertical plate 17 is a similar plate 95 having a transparent window 96 through which may be viewed any matter which may be impressed upon an advertising belt 97, said belt passing over a roller 98 that is secured to a shaft 99 in the casing. By turning the roller 98, the belt will be fed past the window intermittently, and the various advertisements on the belt will thus be brought successively into view. This advertising belt is operated each time the front leaf 3 is operated and each time a cash receptacle is opened and closed through mechanism now to be described.

Secured to the shaft 99 is a ratchet wheel 100, with which engages an actuating pawl 101 on an arm 102 that is pivoted on the shaft. To the arm 102 I secure the upper end of a rod 103, see Figs. 2 and 3, which is normally held in its upper position by a spring 104 which surrounds the rod and bears at its ends against a stationary guide 105 and a collar 106 on the rod. For operating the roller 98 from the front leaf 3, I connect one of the arms 56, through a link 107, to a bell-crank 108, that is pivoted at 109 to the plate 17, the upper end of said bell crank being bifurcated at 110 so as to extend on either side of the rod 103. 111 is a collar that is secured to the rod and pressed against the bell-crank by the spring 104. When the front leaf 3 is moved forwardly, the bell crank 108 is rocked so as to compress the spring 104 and move the pawl 101 backwardly into engagement with a fresh tooth on the ratchet wheel 100; and, when the front leaf is again closed, the spring 104 forces upwardly the rod 103 and thereby causes the pawl 101 to turn the roller 98.

For turning the roller from the various cash receptacles, I extend from each plate 50, see Fig. 10, an arm 112, which when any cash drawer is closed, engages with the lower arm of a bell-crank 113, there being one of said bell cranks for each of the cash drawers. The upper arms of the latter bell cranks are bifurcated at 114 to permit the rod 103 to extend through the same, collars 115 being secured to the rod below the bell cranks and bearing against the latter. Connected with the lower arms of the bell cranks are strong springs 116 which, when a cash drawer is released, rocks the bell crank corresponding therewith and depresses the rod 103 against the tension of the weaker spring 104, the rocking of the bell crank assisting the spring 15 in throwing open the cash receptacle. The rod 103 is thus depressed through the action of the springs 116. When, however, the cash receptacle is closed, the arm 112 rocks the bell crank and permits the spring 104 to thrust the rod upwardly and thus turn the roller 98, as has been hereinbefore described.

It is desirable that an indication be made each time a cash receptacle is opened. This indication may be a visible one, or it may be audible, the drawings showing alarm bells, one for each cash drawer, with means for ringing the same when their respective cash drawers start to move outwardly. In order that each clerk may recognize his own bell and may be notified thereby in case some other clerk has opened his cash receptacle, the bells are given some characteristic tone. These bells are shown at 117, the hammers for the same being shown at 118, said hammers being pressed toward the bells by springs 119. On the upper end of each of the hammer arms 120 I pivot a by-pass pawl 121 which projects into the path of a lug 122 on the arm 112 of the corresponding plate 50. As a cash drawer moves outwardly, the lug 122 engages the by-pass 121 and rocks the hammer lever 120 against the tension of its spring until the lug passes the said by-pass, after which the spring 119 causes the hammer to strike its bell.

While I have shown one embodiment of my inventon, I realize that the principles thereof may be embodied in different forms, and I desire it to be understood that the following claims are not limited to the details shown any further than is made necessary by the specific terms therein employed.

Having thus described my inventon, I claim:

1. In an account recorder having a record strip, the combination with a series of superposed movable leaves, means carried by said leaves for receiving sales slips, and means for feeding said strip when the front leaf of said series is moved.

2. In an account recorder having a plurality of movable record strips, the combination with means for feeding each of said strips independently of the other strips, of a movable leaf, means associated with said leaf for receiving sales slips, and devices for operating any selected feeding means upon the movement of the movable leaf.

3. In an account recorder having a plurality of record strips, the combination with a movable leaf, of devices associated with said leaf for receiving sales slips, mechanisms for feeding said strips independently of one another, and means for operatively connecting a selected record strip with the movable leaf, whereby the movement of the leaf will cause the selected strip to be fed.

4. In an account recorder having a plurality of movable record strips, the combination with a movable leaf, of means associated with said leaf for receiving sales slips, a plurality of reels to which the ends of the record strips are secured, and selective means for connecting one of the reels with the movable leaf to the exclusion of the others whereby the said reel and its connected strip will be moved upon the movement of the movable leaf.

5. In an account recorder having a movable record strip, the combination with a movable leaf, of means associated with said leaf for receiving sales slips, a frame, a pair of reels housed in said frame, the opposite ends of the strip being secured to the said reels, an arm depending from the movable leaf, a movable lever mounted upon the frame, a pivoted lever engaging the said movable lever to raise the same into the path of movement of the movable arm, and a connection between the said movable lever and one of the reels whereby when the leaf is moved the movable lever will be operated to actuate the reel to move the strip.

6. In an account recorder having a movable record strip, the combination with a movable leaf, a frame, a pair of reels mounted in said frame to which the opposite ends of the strip are secured, a lever slidingly pivoted upon said frame, an arm secured upon the movable leaf, a pivoted lever adapted to engage the first mentioned lever to move the same into the path of movement of the arm upon the movable leaf, a dog adapted to engage the lower side of the slidingly pivoted lever to hold the same in the path of movement of the arm upon the movable leaf, connections between the slidingly pivoted lever and one of the reels whereby, when the lever is moved the reel will be rotated to move the strip, and a spring engaging the slidingly pivoted lever tending to pull the said lever backward and downward whereby, when the slidingly pivoted lever is released, it will be returned to its normal position.

7. In an account recorder having a plurality of movable record strips, the combination with a movable leaf, of a series of frames, each frame being provided with a pair of reels to which the opposite ends of the respective strips are secured, a plurality of movable levers pivoted upon said frames, connections between said levers and one of the reels in each frame, a plurality of pivoted levers, each of said levers being connected with one of the movable levers, a depending arm secured to the movable leaf, whereby, when a selected pivoted lever is depressed the corresponding movable lever will be projected into the path of movement of the depending arm, and the said movable lever will be moved to rotate the reel to which it is connected and thus move the strip, when the movable leaf is operated.

8. In an account register having a movable record strip, a casing having an opening in the front thereof by which the said record strip is adapted to pass, a movable leaf mounted upon said casing, means associated with said leaf for receiving sales slips, means for guiding said strip, means for taking up the slack in the strip, and means for moving the strip when the movable leaf is operated in one direction.

9. In an account recorder having a plurality of movable record strips, the combination with a movable leaf, of means associated with said leaf for receiving sales slips, mechanism for moving each strip, and means for operatively connecting the operating mechanism of any desired strip with the movable leaf, whereby the strip will be moved when the leaf is operated.

10. In an account recorder having a plurality of movable record strips, the combination with a movable leaf, of means associated with said leaf for receiving account slips, mechanism for moving each of said strips, a plurality of members, each member being adapted to be operatively connected to a single strip-operating mechanism, whereby upon the operation of any selected member the corresponding strip-operating mechanism will be actuated to move its strip upon the operation of the movable leaf.

11. In an account recorder having a plurality of movable record strips, a casing, a face plate upon the casing having a series of openings, each of said strips extending beneath a corresponding opening in the face plate, a movable leaf mounted upon the casing, means associated with said leaf for receiving sales slips, mechanism for moving each record strip, a plurality of members operated from the face plate, each member having operative connection to a single strip-operating mechanism, whereby the operation of any selected member will secure an operative connection between its corresponding strip-operating mechanism and the movable leaf to move the strip when the movable leaf is operated.

12. In an account recorder having a movable record strip, the combination with a movable leaf, of means associated with said leaf for receiving sales slips, an arm separate from but adapted to be engaged by and moved with the said movable leaf, a lever adapted to be projected into the path of movement of the said arm, and connections between the said lever and the record strip for feeding the latter when the said leaf is moved.

13. In an account recorder having a plurality of movable record strips, the combination with a movable member, of means associated with said member for receiving sales slips, an arm projecting into the path of and adapted to be moved by said member, a series of levers corresponding with the several record strips, means for projecting said levers into the path of movement of the said arm, and connections between the said levers and their separate record strips whereby, when the movable member is operated, the projected lever will cause its corresponding record strip to be moved.

14. In an account recorder having a movable record strip, the combination with a movable leaf, of means associated with said leaf for receiving sales slips, a frame, a pair of reels housed in said frame, the opposite ends of the strip being secured to the said reels, an arm depending from the movable leaf, a movable lever mounted upon the frame, a pivoted lever engaging the said movable lever to raise the same in the path of movement of the movable arm, and means connecting the said movable lever with the record strip whereby, when the leaf is moved the record strip will be fed.

15. In an account recorder having a movable record strip, a cash drawer, a plurality of arms projecting from said drawer, a pivoted latch engaging one of said arms, electro-magnetic means operatively connected to said latch whereby the latch may be withdrawn to release the drawer, a spring normally engaging said drawer to push the same out when the latch is released, mechanism for operating said record strip, and operative connections between the other of said arms upon the drawer and the strip-operating mechanism whereby the strip will be moved when the drawer is pushed inwardly.

16. In an account recorder having a pair of record strips, a movable leaf and a cash drawer, independent mechanism for moving each of said strips, means for securing operative connection between one of the strip-operating mechanisms and the pivoted leaf whereby, when the leaf is moved, the record strip will be moved, a plurality of arms projecting from said cash drawer, a latch engaging one of said arms, electro-magnetic means operatively connected with said latch whereby, when the electro-magnet is energized, the latch will be withdrawn from engagement with the arm to release the drawer, means for pushing said drawer forward at such times, an arm projecting from the other of the strip-operating mechanisms, said arm projecting into the path of the second arm upon the drawer, whereby, when the drawer is pushed inwardly the said depending arm will be engaged by the arm upon the drawer to operate the strip-operating mechanism, whereby the strip will be moved.

17. In an account recorder having a plurality of movable record strips, the combination with a movable leaf, of a cash drawer, and means for feeding one of said record strips when either the cash drawer is opened or the leaf is operated.

18. In an account recorder having a pair of movable record strips, the combination with a movable leaf and a cash drawer, of mechanism for operating each of said strips, means for securing connection between the cash drawer and the mechanism for operating one of said strips, means for securing connection between the movable leaf and the other of said strips whereby the connected strip will be moved when either the cash drawer or the movable leaf is operated.

19. In an account recorder having a pair of movable record strips, the combination with a movable leaf and a cash drawer, of mechanism for feeding each of said strips, connections between the mechanism of one strip and the cash drawer, connections between the other of said strips and the movable leaf, and selective means whereby either the cash drawer or the movable leaf may be operated and the connected strip moved while the other strip remains idle.

20. In an account recorder having a plurality of pairs of movable record strips, the combination with a movable leaf, of a plurality of cash drawers, mechanism for moving each of said strips, means for securing connection between each individual drawer and one of the strips in each pair, means for securing connection between the movable leaf and the other of the strips in each pair, and selective means whereby one of the said strips will be moved when either a selected cash drawer or the pivoted leaf is moved, the others remaining stationary.

21. In an account recorder having a plurality of pairs of movable record strips, the combination with a movable leaf, of a plurality of cash drawers, mechanism for moving each of said strips, means for securing operative connection between one of the strips in each pair and one of the cash drawers, means for securing operative connection between the other of the strips in each pair and the movable leaf, and selective means whereby one of the corresponding strips will be moved upon the operation of a cash drawer or a desired strip will be moved upon the operation of the movable leaf.

22. In an account recorder, a casing, means mounted in said casing for receiving sales slips, a plurality of frames in said casing, a pair or reels mounted in each frame, mechanism for operating each pair of reels, and means for disconnecting the reels from the operating mechanism whereby they may be moved independently of their operating mechanism.

23. In an account recorder having a movable record strip, a pivoted leaf, reels upon which the opposite ends of the record strip are mounted, a ratchet wheel operatively connected with each of the reels, means for securing a connection between the pivoted leaf and one of the reels, whereby the record strip will be moved when the pivoted leaf is moved, and means for disconnecting the ratchet wheel from the reel.

24. In an account recorder having a movable record strip, a movable leaf, reels upon which the opposite ends of the record strip are secured, a ratchet wheel, a plunger having keyed connection with the ratchet wheel and with one of the reels, a connection between the movable leaf and one of the reels whereby the record strip may be moved when the leaf is moved.

25. In an account recorder having a movable record strip, a movable leaf, reels upon which the opposite ends of the record strip are secured, a ratchet wheel mounted adjacent one of said reels, a member for keying the ratchet wheel to the said reel, a spring normally holding the member so as to secure operative relation between the ratchet wheel and the reel, said member being adapted to be withdrawn whereby the ratchet wheel will be disconnected from the reel, and a connection between the pivoted leaf and the said reel whereby the record strip will be moved when the movable leaf is moved.

26. In an account recorder having a movable record strip, a pivoted leaf, reels upon which the ends of the record strip are mounted, a frame in which the said reels are housed, a ratchet wheel mounted upon the said frame, a plunger establishing operative connection between the ratchet wheel and one of the reels, a spring normally holding said plunger in position to secure such operative relation, said plunger being adapted to be withdrawn whereby the reel will be disconnected from the ratchet wheel, and means for establishing connection between the pivoted leaf and the ratchet wheel whereby the record strip will be moved when the movable leaf is actuated.

27. In an account recorder, the combination with a movable leaf and a cash drawer, of a movable belt, connections between the movable belt and the movable leaf and cash drawer whereby the said belt will be moved when either the movable leaf or cash drawer is operated.

28. In an account recorder, the combination with a movable leaf and a cash drawer, of a belt, rollers upon which said belt is mounted, a rod operatively connected to one of the rollers to rotate the same, and connections between said rod and the movable leaf and cash drawer whereby the rod will be operated to rotate the roll when either the movable leaf or cash drawer is operated.

29. In an account recorder, the combination with a movable leaf and a cash drawer, of a belt, rollers upon which said belt is mounted, a movable rod, connections between said rod and one of said rollers whereby the roller may be rotated by the said rod, a spring connected to said rod, connections between the movable leaf and the rod, and connections between the cash drawer and the movable rod whereby, when either the cash drawer is opened or the movable leaf operated said rod will be depressed whereby the spring will be compressed, said spring being adapted to return the rod to its normal position when the cash drawer or movable leaf is returned to its initial position, whereby the rollers and belt will be moved.

30. In an account recorder, a casing, a movable leaf mounted upon the casing, a cash drawer housed within the casing, a belt within the casing, said casing having an opening behind which said belt passes, connections between the movable belt and movable leaf and cash drawer, whereby the belt will be moved to present a new portion thereof before the opening in the casing whenever the movable leaf or cash drawer is operated.

31. In an account recorder having a pair of movable record strips, the combination with a movable leaf and a cash drawer, of connections between one of said strips and the movable leaf, connections between the other of said strips and the cash drawer, a movable belt, connections between the said movable belt and the movable leaf and cash drawer, whereby when either movable leaf or cash drawer is operated, the corresponding movable record strip and the said belt will be moved.

32. In an account recorder having a plurality of pairs of movable record strips, the combination with a movable leaf and a plurality of cash drawers, of means for connecting one of the strips in each pair with a single cash drawer, and selective means for connecting the other movable record strips in said pairs with the movable leaf, a movable belt carrying advertising matter, connections between said belt and the movable leaf and between the belt and each cash drawer, whereby when either the movable leaf or a cash drawer is operated the corresponding record strip and the belt will be moved.

33. In an account recorder having a movable record strip, devices for feeding said record strip, a plurality of vertically disposed pivoted leaves, said leaves being provided with means for holding sales slips, and means associated with said leaves for operating said feeding devices whenever the leaves are moved upon their pivots into position for filing a sales slip.

34. In an account recorder having a movable record strip, devices for feeding said record strip, a plurality of vertically disposed pivoted leaves, a plurality of spring clips on each leaf for receiving sales slips, and means associated with said leaves for operating said feeding devices whenever a leaf is moved as a sales slip is placed beneath a clip.

35. In an account recorder having a movable record strip, devices for feeding said record strip, a plurality of pivoted leaves, said leaves normally standing in a substantially vertical position, but being capable of being moved into a substantially horizontal position, spring clips upon each of said leaves behind which sales slips may be filed when one or more of said leaves are in open position, and means associated with said leaves for operating said feeding devices as one or more of said leaves are moved into open position.

36. In an account recorder having a movable record strip, a casing having a vertical extension at the rear, a substantially horizontal portion in front of said extension, and a downwardly sloping portion in front of said horizontal portion, said downwardly sloping portion being provided with an opening, a record strip within the casing opposite said opening in position to be written upon through the opening, means for feeding said record strip, a plurality of pivoted leaves within the vertical extension of the casing, said leaves normally standing in a normally vertical position but being capable of being moved into a substantially horizontal position above the horizontal portion of the casing, the said leaves when moved into the horizontal position leaving the opening in the sloping portion of the casing uncovered, means on said leaves for filing sales slips, and means associated with said leaves for feeding the record strips whenever one or more of the leaves are moved from vertical to horizontal position.

37. In an account recorder having a plurality of movable record strips, the combination with devices for feeding said strips independently of one another, of a plurality of pivoted leaves mounted in said recorder, spring clips on each of said leaves for holding account slips, a member coöperating with said leaves and adapted to be moved when either of the leaves is moved for filing the sales slips, and selective means for connecting the feeding devices for any one of the record strips with the said member whereby when a leaf is moved from its vertical position, a selected record strip will be fed.

In testimony whereof, I hereunto affix my signature in the presence of two witnesses.

PERRY A. McCASKEY.

Witnesses:
D. M. ARMSTRONG,
W. H. DRESSLER.